United States Patent [19]
Roeske

[11] 3,729,185
[45] Apr. 24, 1973

[54] HYDRAULIC WORK SUPPORT

[75] Inventor: Eugene A. Roeske, Clarendon Hills, Ill.

[73] Assignee: Owatonna Tool Company, Owatonna, Minn.

[22] Filed: Apr. 1, 1971

[21] Appl. No.: 130,232

[52] U.S. Cl. ..................269/20, 188/67, 248/411, 269/296, 269/310
[51] Int. Cl. ..................G25b 11/00, B23q 3/10
[58] Field of Search ..................188/67; 248/402, 248/411; 269/20, 27, 30, 289, 296, 309, 310

[56] References Cited

UNITED STATES PATENTS

| 3,421,750 | 1/1969 | Tridgell | 269/310 X |
| 3,537,701 | 11/1970 | Claycomb | 269/309 |
| 3,559,980 | 2/1971 | Terai | 269/296 X |

FOREIGN PATENTS OR APPLICATIONS

| 1,081,361 | 6/1954 | France | 188/67 |

Primary Examiner—Granville Y. Custer, Jr.
Assistant Examiner—Neil Abrams
Attorney—Axel A. Hofgren et al.

[57] ABSTRACT

A hydraulically locked work support including a housing having a bore, a sleeve mounted in said bore, a seal at each end of the sleeve in sealing engagement with the bore to define a chamber between the sleeve and the housing, a work support assembly mounted for reciprocal motion in said sleeve and having an outer diameter substantially equal to the inner diameter of said sleeve, a spring biasing said assembly into engagement with a work piece, and a source of hydraulic fluid for pressurizing said chamber to hydraulically lock the assembly in a fixed position within said sleeve.

6 Claims, 2 Drawing Figures

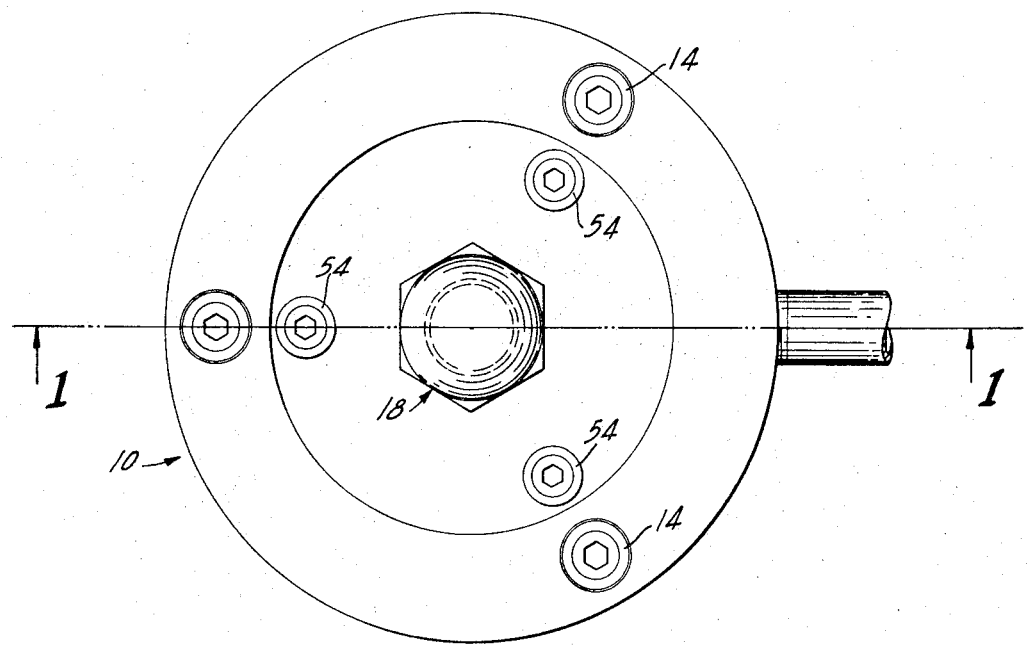
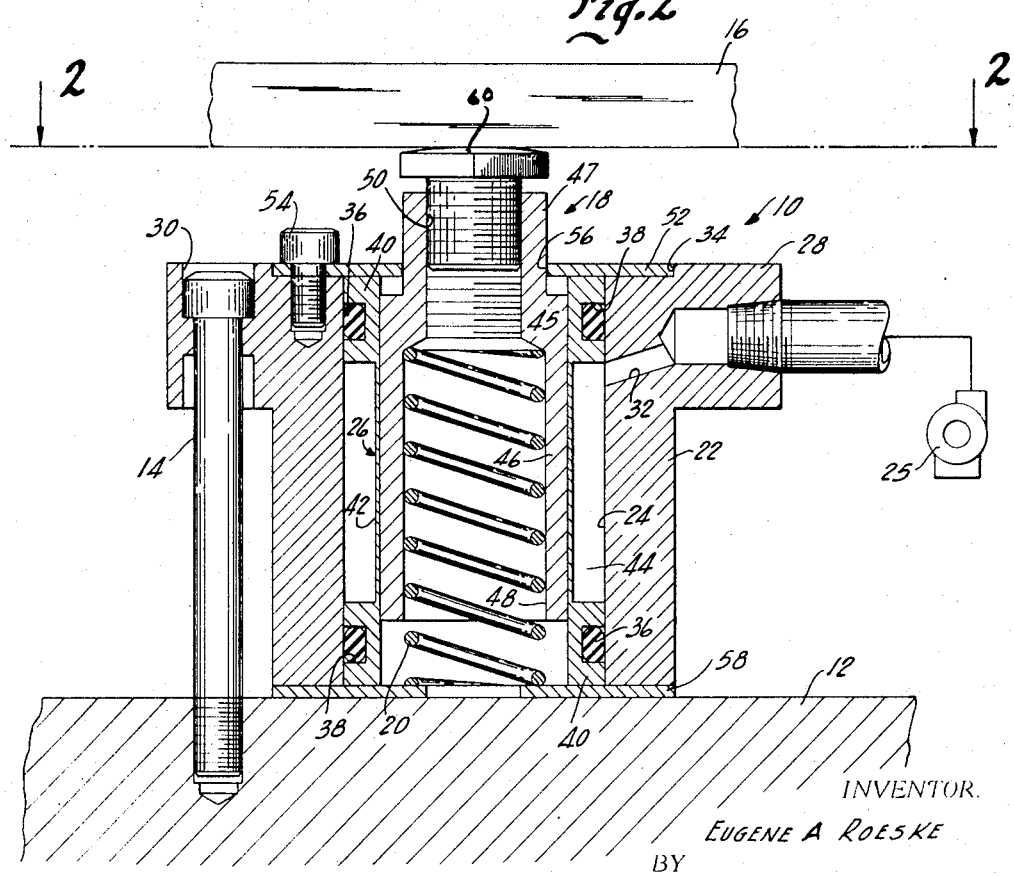

HYDRAULIC WORK SUPPORT

BACKGROUND OF THE INVENTION

In machining operations, the work piece is often supported at spaced intervals leaving large unsupported areas of the work piece spaced from the work surface. When a machine tool is brought into engagement with the work piece, the work piece has a tendency to bend causing a distortion in the machining operation. In order to provide support for the unsupported areas of the work piece, a support is often placed in the space between the work piece and work surface to prevent any bending of the work piece during the machining operation. However, since there is often a variation in the dimensions of different work pieces, a check and often an adjustment of the support is required.

SUMMARY OF THE INVENTION

The work holding support of the present invention after being initially set up automatically adjusts to any variation in dimension which affects height or distance between the work piece and the work table. Once the work piece has been securely fixed in position on the work table, the work supporting members automatically adjust to the distance between the work piece and work table and are then locked in a fixed position to provide support for the unsupported areas of the work piece. The work holding support of this invention includes a support assembly which is supported for sliding motion within a thin metal sleeve. The work holding support is mounted on the surface of a work table in a position to underlie the work piece. When the work piece is mounted on the work table, the support assembly is adjusted to engage the work piece and is then biased by a spring to always be in contact with the work piece. The sleeve is then hydraulically pressurized to lock the support assembly in a fixed position for the machining operation. As each subsequent work piece is mounted on the work table the support assembly will automatically adjust to any variation in distance between the surface of the work table and the work piece. The support assembly is again locked in position to provide support for the work piece during the machining operation. This automatic adjustment simplifies set up time particularly where a plurality of work holding supports are required for a particular machining operation.

Other objects and advantages will be apparent when read in connection with the accompanying drawings.

THE DRAWINGS

FIG. 1 is a cross sectional view taken on line 1—1 of FIG. 2 showing the work support with the support assembly in the initial position;

FIG. 2 is a top view taken on line 2—2 of FIG. 1.

DESCRIPTION OF THE INVENTION

The work support 10 of the present invention is placed on the surface of a work table 12 and is secured thereto by bolts 14. The work support 10 is located in a position to underlie the unsupported area of a work piece 16 which is normally secured to the work table by any known means located at spaced distances from each other. The work piece 16 is supported by means of a support assembly 18 provided in the work support 10. The support assembly 18 is biased against the work piece 16 by means of a spring 20, so that the support assembly always bears against the undersurface of the work piece 16. The work holding support is then pressurized by any means such as pump 25 to lock the support assembly 18 in a fixed position. As each work piece is completed and another work piece placed in position on the work table 12, the support assembly will automatically adjust to any variation in distance or height between the work piece 16 and the surface of the work table 12 to assure proper support for the work piece 16.

In accordance with the invention, the work support 10 includes a housing 22 having a central passage or bore 24 and a thin flexible metal sleeve 26. The support assembly 18 is mounted for axial movement within the sleeve 26 which is spaced from the walls of the bore 24 in the housing 22. Hydraulic fluid under pressure is admitted to the space between the sleeve 26 and the housing 22 hydraulically locking the support assembly in a fixed position within the sleeve 26.

More particularly, the housing 22 includes a mounting flange 28 provided around the outer periphery of the housing 22. A number of mounting holes 30 are provided in the flange 28 for the bolts 14. Fluid is admitted to the bore 24 by means of a passage 32 which is connected to the pump 25. A recess 34 is provided around the top of the bore 24.

The metal sleeve 26 is positioned within the bore 24 and is sealed therein by means of O-ring seals 36 provided in grooves 38 in enlarged sections 40 located at each end of the sleeve 26. A thin tubular, flexible section 42 extends between the enlarged sections 40 and is spaced from the walls of the bore 24 to define a pressure chamber 44. Hydraulic fluid is admitted to the chamber 44 to squeeze the flexible section 42 against the support assembly 18.

The support assembly 18 includes a cylindrical member 46 which is mounted for axial movement within the sleeve 26 and has an outer diameter substantially equal to the inner diameter of the flexible section 42. A bore 48 is provided at one end of the member 46 to house the spring 20 and a threaded section 50 is provided at the other end of the bore 48. A shoulder 45 is provided at the end of a reduced diameter section 47.

The cylindrical member 46 is retained within the sleeve 26 by means of a plate 52 positioned in the recess 34 in the top of the housing 22. The plate 52 is retained in the recess by means of bolts 54 and includes a central opening 56 which is positioned to engage the shoulder 45. The spring 20 is retained in the bore 24 by means of a plate 58 provided at the other end of the housing 22.

The height of the support assembly 18 is adjusted by means of a bolt 60 threadedly received in the threaded section 50 of the member 46. The bolt 60 is normally rotated into engagement with the undersurface of the work piece 16. Rotation of the bolt 60 is continued after engagement with the work piece 16 to drive the member 46 downward in the sleeve 26 far enough for the shoulder 45 to clear the plate 52. Hydraulic fluid 44 under pressure is admitted to chamber 44 to lock the sleeve 26 to the cylindrical member 46.

Once the work support 10 has been set up for a particular work piece 16, the support assembly 18 will automatically adjust for any variation which may be present in subsequent work pieces. As each work piece 16 is placed on the work table 12, the support assembly 18 will be automatically depressed and locked in position by hydraulic force.

Although the sleeve 26 has been shown as having an internal diameter which engages the external diameter of the member 46, it is also within the contemplation of this invention to use the external diameter of the sleeve as the locking surface with either a work piece or a support assembly having an internal diameter equal to the external diameter of the sleeve. The sleeve can be mounted on an internal housing and hydraulic fluid admitted to the interior of the sleeve, to expand the sleeve and hydraulically lock the sleeve against the internal diameter of the bore in the work piece or the support assembly.

I claim:

1. A hydraulically locked device comprising a housing,
    a thin, flexible metal sleeve mounted in association with said housing,
    means for sealing said sleeve to said housing to define a fluid chamber between said sleeve and said housing,
    a support assembly mounted for movement with respect to said sleeve, means for applying hydraulic fluid pressure to said fluid chamber to hydraulically lock said assembly in a fixed position, means for limiting the movement of said assembly with respect to said sleeve, and a spring positioned to bias said assembly toward one end of said sleeve.

2. A hydraulically locked work holding support for supporting a work piece on a work table, said support comprising,
    a housing adapted to be mounted on the work table and having a central bore,
    a sleeve having enlarged sections at each end positioned in said bore,
    means in said enlarged sections for sealingly engaging said bore to define a pressure chamber between said sleeve and said bore,
    a cylindrical member mounted for axial motion in said sleeve,
    said member having an outer diameter substantially equal to the inner diameter of said sleeve,
    a spring positioned in said sleeve to bias said member toward said work piece,
    and means for admitting hydraulic fluid under pressure into said chamber to lock said sleeve to said member.

3. The support according to claim 2 wherein said member includes a threaded section at one end and a bolt threadedly received in said threaded section for adjusting the length of said member.

4. The support according to claim 2 including means for retaining said member in said sleeve.

5. A work-holding support comprising, a housing, a thin, flexible sleeve mounted in association with said housing, means for sealing said sleeve to said housing to define a fluid chamber between said sleeve and said housing, a support assembly mounted for movement lengthwise of said sleeve, means for limiting movement of said support assembly outwardly of said sleeve, means for biasing said support assembly outwardly of said sleeve toward a support position, and means for applying fluid pressure to said fluid chamber to exert radial forces on said sleeve and cause the sleeve to grip the support assembly and lock said assembly in said support position.

6. A work-holding support as defined in claim 5 including an adjustable member at the outer end of the support assembly whereby the effective length of said support assembly may be changed.

* * * * *